US011247919B2

(12) United States Patent
Raynel (10) Patent No.: US 11,247,919 B2
(45) Date of Patent: *Feb. 15, 2022

(54) SOUR WATER TREATMENT

(71) Applicant: Saudi Arabian Oil Company, Dhahran (SA)

(72) Inventor: Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,372

(22) Filed: May 19, 2020

(65) Prior Publication Data

US 2021/0363032 A1 Nov. 25, 2021

(51) Int. Cl.
*B01D 61/02* (2006.01)
*B01D 61/08* (2006.01)
(Continued)

(52) U.S. Cl.
CPC .......... *C02F 1/4672* (2013.01); *B01D 61/022* (2013.01); *B01D 61/027* (2013.01);
(Continued)

(58) Field of Classification Search
CPC ............................ C02F 1/4672; C02F 1/4676; C02F 2101/101; C02F 2103/365; B01D 2311/2684
See application file for complete search history.

(56) References Cited

U.S. PATENT DOCUMENTS 2,383,674 A * 8/1945 Osborne ............... C25B 1/14
423/422
3,806,435 A * 4/1974 Ohta ................... C02F 1/463
588/303
(Continued)

FOREIGN PATENT DOCUMENTS

GB 1374010 11/1974
KR 101947311 5/2019
(Continued)

OTHER PUBLICATIONS

Waterston, Katie, Dorin Bejan, and Nigel J. Bunce. "Electrochemical oxidation of sulfide ion at a boron-doped diamond anode." Journal of applied electrochemistry 37.3 (2007): 367-373. (Year: 2007).*

(Continued)

*Primary Examiner* — Bradley R Spies
(74) *Attorney, Agent, or Firm* — Fish & Richardson P.C.

(57) ABSTRACT

A system and method of treating sour water, including providing sour water having hydrosulfide ions and a carbon-containing compound to an anodic chamber of an electrolyzer vessel, converting the hydrosulfide ions into sulfate ions in the anodic chamber via an oxido half-reaction of a first oxido-reduction reaction and generating carbon dioxide in the anodic chamber via an oxido half-reaction of a second oxido-reduction reaction associated with the carbon-containing compound. The technique includes reacting the carbon dioxide with hydroxide ions in the anodic chamber to generate bicarbonate ions. The technique includes discharging an anodic chamber solution having the sulfate ions and the bicarbonate ions from the electrolyzer vessel from the anodic chamber.

17 Claims, 5 Drawing Sheets

(51) Int. Cl.

| | | |
|---|---|---|
| *C02F 1/00* | (2006.01) | |
| *C02F 1/44* | (2006.01) | |
| *C02F 1/467* | (2006.01) | |
| *C02F 101/10* | (2006.01) | |
| *C02F 103/36* | (2006.01) | |
| *C02F 1/52* | (2006.01) | |
| *C02F 1/66* | (2006.01) | |
| *C02F 103/18* | (2006.01) | |

(52) U.S. Cl.
CPC .............. *B01D 61/08* (2013.01); *C02F 1/001* (2013.01); *C02F 1/442* (2013.01); *C02F 1/4676* (2013.01); *C02F 1/52* (2013.01); *C02F 1/66* (2013.01); *B01D 2311/2642* (2013.01); *B01D 2311/2649* (2013.01); *B01D 2311/2684* (2013.01); *B01D 2317/022* (2013.01); *C02F 2001/5218* (2013.01); *C02F 2101/101* (2013.01); *C02F 2103/18* (2013.01); *C02F 2103/365* (2013.01); *C02F 2201/46115* (2013.01)

(56) References Cited

U.S. PATENT DOCUMENTS

| | | | |
|---|---|---|---|
| 4,253,928 A | 3/1981 | Blutas et al. | |
| 4,526,662 A * | 7/1985 | Byerley | C02F 1/4672 |
| | | | 205/351 |
| 4,995,952 A | 2/1991 | Dandapani et al. | |
| 5,246,597 A | 9/1993 | Jenson et al. | |
| 5,431,877 A | 7/1995 | Brucken et al. | |
| 5,531,865 A | 7/1996 | Cole | |
| 6,241,871 B1 | 6/2001 | Donini et al. | |
| 7,306,735 B2 | 12/2007 | Baggott et al. | |
| 8,685,236 B2 | 4/2014 | Miller | |
| 9,708,196 B2 | 7/2017 | Brenize et al. | |
| 2007/0183953 A1* | 8/2007 | Kerley | C01B 17/32 |
| | | | 423/244.07 |
| 2012/0273367 A1 | 11/2012 | Themy et al. | |
| 2013/0213892 A1* | 8/2013 | Henthorne | B01D 61/025 |
| | | | 210/650 |
| 2014/0246382 A1 | 9/2014 | Matza et al. | |
| 2018/0179097 A1 | 6/2018 | Navarro et al. | |

FOREIGN PATENT DOCUMENTS

| | | |
|---|---|---|
| WO | 93025636 | 12/1993 |
| WO | WO 2004022796 | 3/2004 |
| WO | WO 2011069192 | 6/2011 |
| WO | 2016102568 | 6/2016 |

OTHER PUBLICATIONS

Curcio, Efrem, et al. "Hybrid nanofiltration-membrane crystallization system for the treatment of sulfate wastes." Journal of Membrane Science 360.1-2 (2010): 493-498. (Year: 2010).*

Hatcher, Nathan A. et al—Sour water stripping Part 2: phenolic water—Digital Refining, Aug. 2014 (Year: 2014).*

Weiland, Ralph H. et al—Distribution of HCN in sour water systems—Digital Refining, Apr. 2014 (Year: 2014).*

Paidar et al., "Membrane electrolysis—History, current status and perspective," Electrochimica Acta., 2016, 209: 737-756.

Vasudevan, "Membranes and Diaphragms for Electrochemical Processes (Part—I)," Res. J. Chem. Sci., Feb. 2013, 3(2): 1-3.

PCT International Search Report and Written Opinion in International Appln. No. PCT/US2021/032965, dated Aug. 3, 2021, 15 pages.

* cited by examiner

SOUR WATER TREATMENT

TECHNICAL FIELD

This disclosure relates to treating sour water.

BACKGROUND

Sour water may be water (e.g., process water) that contains hydrogen sulfide ($H_2S$). The sour water may additionally include ammonia ($NH_3$) in some cases. Sources of sour water can vary. Sour water may be generated, for example, in petroleum refineries or gas processing plants. For instance, sour water can include wastewater produced from atmospheric and vacuum crude columns in refineries. In a complex refinery, the sour water generally comes from distillation, fluid catalytic cracking, catalytic reforming, coker and acid gas removal units, with other operations contributing to the balance. The different streams of sour water may be collected in a surge tank for centralized processing via a stripper column.

To remove $H_2S$ (and $NH_3$) from sour water to recover the water for reuse, the sour water may be subjected to steam stripping in a sour water stripper to remove the $H_2S$ and $NH_3$. The sour water stripper is a stripping tower that is a reboiled distillation column. The steam-stripped hydrogen sulfide and ammonia discharges overhead from the column. The removed $H_2S$ may be recovered at some facilities. The recovered water discharges as a bottoms stream from the column.

SUMMARY

An aspect relates to a method of treating sour water, including providing sour water having hydrosulfide ions and a carbon-containing compound to an anodic chamber of an electrolyzer vessel. The electrolyzer vessel includes the anodic chamber and a cathodic chamber separated by a diaphragm. The method includes generating, via an electric power source, an electric potential between an anode in the anodic chamber and a cathode in the cathodic chamber. The method includes converting the hydrosulfide ions into sulfate ions in the anodic chamber via an oxido half-reaction of a first oxido-reduction reaction. The method includes generating carbon dioxide in the anodic chamber via an oxido half-reaction of a second oxido-reduction reaction associated with the carbon-containing compound. The method includes reacting the carbon dioxide with hydroxide ions in the anodic chamber to generate bicarbonate ions. The method includes discharging an anodic chamber solution from the electrolyzer vessel from the anodic chamber as a discharged anodic-chamber solution having the sulfate ions and the bicarbonate ions.

Another aspect relates to a sour-water treatment system having an electrolyzer vessel to receive electricity from an electric power source to generate an electric potential between an anode and a cathode in the electrolyzer vessel. The electrolyzer vessel has an anodic chamber to receive sour water having hydrosulfide ions and a carbon-containing compound. The anodic chamber has the anode to convert the hydrosulfide ions into sulfate ions via an oxido half-reaction of a first oxido-reduction reaction and generate carbon dioxide via an oxido half-reaction of a second oxido-reduction reaction associated with the carbon-containing compound. The carbon dioxide reacts with hydroxide ions to generate bicarbonate ions. The sour-water treatment system includes a separation system having membranes to remove the bicarbonate ions and water from a discharged anodic-chamber solution discharged from the anodic chamber to give a processed discharged anodic-chamber solution having a greater concentration of sulfate ions than in the discharged anodic-chamber solution.

The details of one or more implementations are set forth in the accompanying drawings and the description below. Other features and advantages will be apparent from the description and drawings, and from the claims.

BRIEF DESCRIPTION OF DRAWINGS

Like designations in the various drawings may indicate like elements.

DETAILED DESCRIPTION

Some aspects of the present disclosure are directed to treatment of sour water. A source of the sour water may be, for example, sour water generated at a gas plant or petroleum refinery. The sour water may be conventionally treated in some instances in a sour water stripper (steam-reboiled distillation column). The sour water may include ammonium hydrosulfide, hydrogen sulfide (e.g., trace levels), phenol, hydrogen cyanide, etc. The sour water may be water that discharges from a sulfur recovery plant in a gas plant and that includes sulfur dioxide or hydrogen sulfide ($H_2S$), or both. Other sources and compositions of sour water are applicable. The conventional treatments of sour water may not address contaminants such as phenolic compounds and hydrogen cyanide.

In treating sour water having hydrosulfide ions, embodiments of the present techniques facilitate the sequential transformation of hydrosulfide ions into sulfite ions: (1) hydrosulfide ions are converted into sulfate ions on an electrolyzer anode; (2) concentration of the sulfate ions by a nanofiltration (NF) series outside of the electrolyzer; and (3) the sulfate ions converted into sulfite ions on the electrolyzer cathode. Advantageously, in this sequential transformation, phenol and hydrogen cyanide in the sour water are converted into carbon dioxide and nitrogen. The aqueous solution discharged from the cathode side of the electrolyzer may be sent to a crystallizer. In some embodiments, the aqueous solution discharged from the cathode side of the electrolyzer may be sent through an NF series (as pre-stage concentration) to the crystallizer. The crystallizer discharges a recovered water stream and a residual stream. The residual stream is separated by filtration into (1) sodium sulfite as a solid and (2) a concentrated aqueous solution of ammonium sulfite, which can both be valorized.

As used herein, the term "sour water" may refer to an aqueous composition having sulfides in concentrations greater than 100 parts per million by weight (ppmw) (0.01 weight percent (wt. %)).

As used herein, the term "phenolic compound" may refer to compounds having at least one aromatic hydrocarbon group containing at least one hydroxyl group bonded directly to the aromatic hydrocarbon group.

As used herein, the term "metal hydroxide" may refer to "alkali metal hydroxide" or "alkaline metal hydroxide." The term "alkali metal hydroxide" may refer to the hydroxide salt of a metal in Group 1 of the International Union of Pure and Applied Chemistry periodic table of the elements (IUPAC periodic table), such as sodium hydroxide, potassium hydroxide, or lithium hydroxide, or any combinations thereof. The term "alkaline metal hydroxide" may refer to the hydroxide salt of a metal in Group 2 of the IUPAC periodic table (alkaline earth metals), such as magnesium hydroxide or calcium hydroxide, or a combination thereof.

Figure 1:
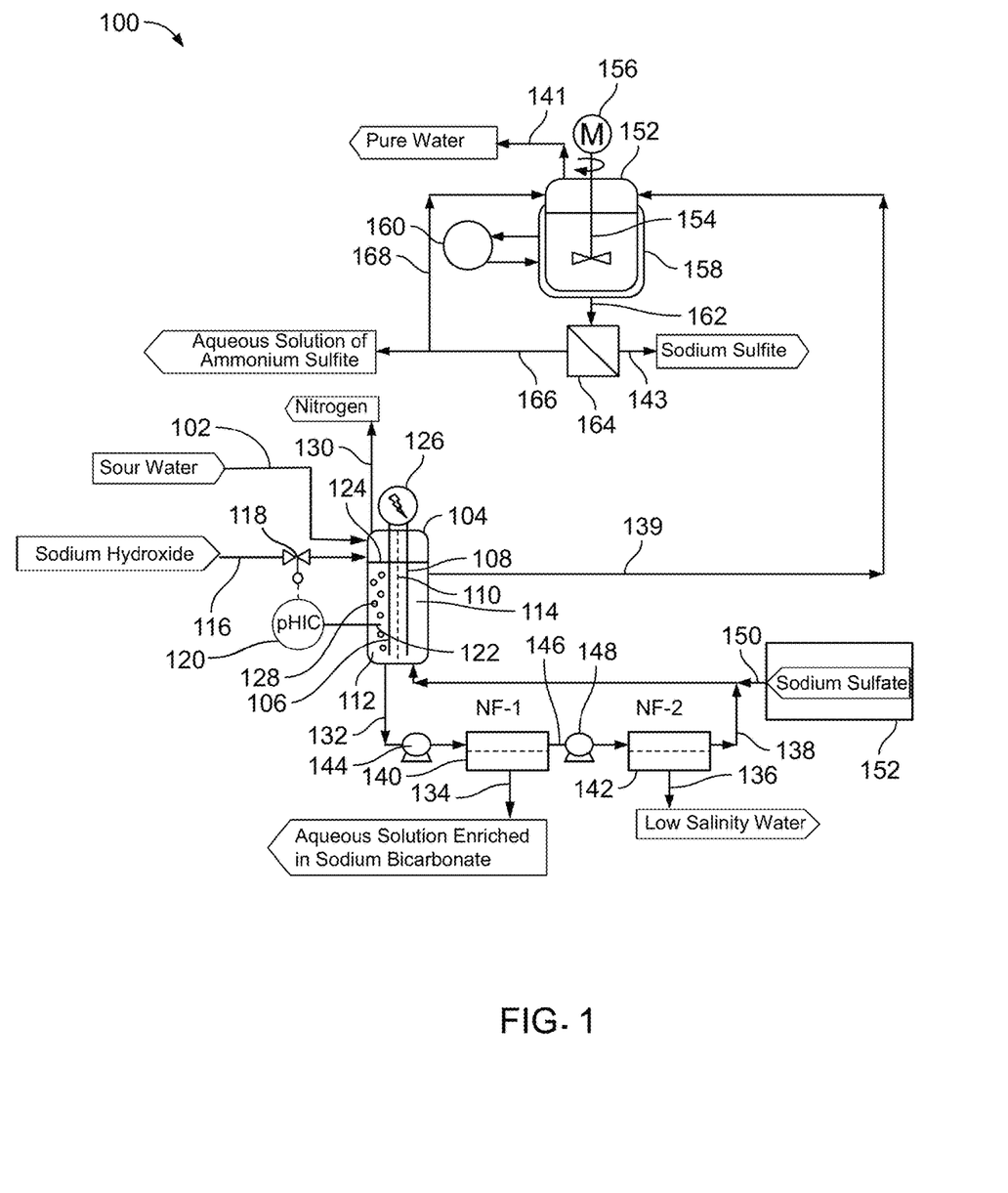
FIG. 1 is a diagram of a sour-water treatment system.

FIG. 1 is a sour-water treatment system 100 that utilizes hydrosulfide chemistry to treat sour water 102 (having hydrosulfide ions) to recover fresh water and manufacture sulfite salts. The sour-water treatment system 100 employs hydrosulfide electrolysis with cogeneration of the sulfite salts. Moreover, phenol and hydrogen cyanide in the sour water 102 are beneficially converted into carbon dioxide and nitrogen. The phenol may be the particular compound $C_6H_6O$ but also encompass phenols (phenolic compounds) incorporating the $C_6H_6O$ structure.

The sour water 102 to be treated is fed to a diaphragm electrolyzer 104 vessel having two electrodes including an anode 106 and a cathode 108. A diaphragm 110 is disposed between the anode 106 and the cathode 108. The anode 106 is in the anodic chamber 112 (anode chamber) of the electrolyzer 104. The cathode 108 is in the cathodic chamber 114 (cathode chamber) of the electrolyzer 104. The anodic chamber 112 and the cathodic chamber 114 are separated by the diaphragm 110. The anodic chamber 112 and the cathodic chamber 114 may each be characterized as a compartment or cavity in the electrolyzer 104 vessel. The electrolyzer 104 may have more than two electrodes. For instance, the electrolyzer 104 may have multiple anodes 106 disposed in the anodic chamber 112 and multiple cathodes 108 disposed in the cathodic chamber 114.

The electrolyzer 104 vessel may be polymeric-coated metal, such as polytetrafluoroethylene (PTFE)-coated stainless steel. The anode 106 and the cathode 108 may each be a ceramic or metal (or metal oxide). An example electrode metallurgy is a nickel alloy to give the anode 106 and the cathode 108 as nickel-based electrodes.

The diaphragm 110 may be a cation-exchange diaphragm so to avoid potential decomposition of sulfite ions into sulfate at the anode 108. In other words, the diaphragm 110 may act as a physical barrier to prevent sulfite ions (anions) from the cathodic chamber 114 into the anodic chamber 112.

The cation-exchange diaphragm 110 material may be a sulfonated tetrafluoroethylene based fluoropolymer-copolymer (e.g., Nafion®). The diaphragm 110 may be a fluorinated cation-exchange diaphragm, such as including fluorinated carboxylic polymer. An example is FLEMION™ fluorinated cation-exchange diaphragm available from AGC Chemicals Americas, Inc. having headquarters in Exton, Pa., USA. The diaphragm 110 may be a Neosepta-F cation-exchange diaphragm available from ASTOM Corporation having headquarters in Tokyo, Japan. Other examples of cation-exchange diaphragms 110 are applicable.

The sour water 102 is provided via a conduit to the electrolyzer 104. The sour water is fed to the oxidative side (anodic chamber 112) of the electrolyzer 104. The sour water 102 is an aqueous composition having hydrosulfide ions and a carbon-containing compound, such as phenol or hydrogen cyanide, or both. In one example, the sour water 102 is water having at least the following components: $H_2S$ (e.g., at least 100 ppmw or in a range of 150-40,000 ppmw), ammonium hydrosulfide (e.g., at least 25,000 ppmw or in a range of 10,000-100,000 ppmw), hydrogen cyanide (e.g., at least 300 ppmw or in a range of 300-500 ppm), and phenol ($C_6H_6O$) (e.g., at least 200 ppmw or in a range of 50 ppmw to 500 ppmw). The phenol may be phenols (phenolic compounds) more broadly. The flowrate of the sour water 102 through the conduit as introduced into anodic chamber 112 of the electrolyzer 104 may be, for example, at least 1 cubic meter per hour ($m^3/hr$), at least 10 $m^3/hr$, at least 20 $m^3/hr$, at least 22 $m^3/hr$, or at least 22 $m^3/hr$, and so on.

In operation, the pH may be maintained in the electrolyzer 104 at about 8 (or at least 7.5 or at least 8) for the reaction(s) in the electrolyzer 104 to form sodium bicarbonate. The pH in the electrolyzer 104 should generally be basic (pH greater than 7) as the oxido-reduction reactions are generally pH-dependent. Secondly, the control of pH in the electrolyzer 104 facilitates to separate carbon species from sulfated ions in the nanofiltration discussed below.

In the illustrated embodiment, a metal hydroxide 116 (e.g., sodium hydroxide (NaOH)) is fed through a flow control valve 118 to the anodic chamber 112 to maintain (control) the pH in the fluid mixture in the electrolyzer 104 at a specified value (e.g. a set point) (e.g., 7.5, 8, 8.3, 8.5, etc.). The addition of the metal hydroxide 116 controls the pH in the electrolyzer 104 and the nature of the carbonate species discharged from the anodic chamber 112 to the downstream nanofiltration. In the illustrated implementation, the desired set-point value for pH may be, for instance, user-input (e.g., via a control system) to the pH indicator controller (pHIC) 120. The pHIC 120 may indicate the pH as measured by a pH sensing element 122. The sensing element 122 may be, for example, a pH probe extending into the fluid mixture in the anodic chamber 112. Based on the measured pH value, the pHIC 120 may direct the flow control valve 118 to adjust valve position (e.g., percent open) to maintain the pH in the electrolyzer 104 at set point.

The cation-exchange diaphragm 110 may facilitate maintaining the pH in the electrolyzer 104 with the exchanging of proton $H^+$ through the diaphragm 110. As the metal hydroxide 116 (e.g., NaOH) is added in the anodic chamber 112, the thermodynamics of the fluid mixture in the anodic chamber 112 drives to equilibrate the pH by diffusion of protons $H^+$ from the cathodic side (cathodic chamber 114) to the anodic side (anodic chamber 112). The proton comes from the dissociation of water:

A proton (or cation) ion-exchange membrane 110 may be implemented for the diffusion of proton in water, which is generally significantly faster than the diffusion of hydroxide ion in water.

The fluid level 124 of the fluid mixture (aqueous solution) in the electrolyzer 104 vessel may be maintained at a specified liquid level 124 via flow control of entering streams (e.g., sour water 102) and discharged streams. The fluid level in the cathodic chamber 114 may be the same or similar as the fluid level in the anodic chamber 112. The operating temperature in electrolyzer 104 may be, for example, in the range of ambient (e.g., 25° C.) to 80° C. Water evaporation may occur at temperatures above 80° C. The operating pressure may be maintained at slightly above ambient (atmospheric) to avoid the introduction of oxygen via air entering electrolyzer 104 from the environment. For instance, the operating pressure in the electrolyzer may be in the range of 1.1 to 1.5 bar.

An electric power source 126 supplies electric current (electrons) to the cathode 108 for the electrochemical reduction at the cathode 108 to occur. The power source 126 may be a battery, a power generator, an electrical grid, a renewable source of power, etc. The applied electric current may be modulated or regulated. The desired amount of current or current density (or set point of the amount of current or current density supplied) may be determined correlative with the electrochemical reaction requirements at the anode 106 and cathode 108. The amount of current supplied by the power source 126 may be modulated via a variable resistor or potentiometer, or by varying voltage, and the like. The amount of current supplied by the power source 126 may be modulated via a controller directing the variable resistor or potentiometer, or the varying of the voltage.

The electric power source 126 may be electrically coupled to each of the anode 106 and the cathode 108 to produce an electric potential between the anode 106 and the cathode 108, causing an electric current to pass through the fluid mixture in the electrolyzer 104. The electric power source 126 may produce voltage and current to convert sulfides to sulfates, convert carbon-containing compounds to bicarbonate compounds, and convert sulfates to sulfites, and so forth. In some embodiments, the electric power source 126 may be a direct current (DC) power source. The electric potential (voltage) may be at least 1 volt, less than 5 volts, or in the ranges of 1 volt to 5 volts, 1 volt to 3.5 volts, 1.5 volt to 5 volts, or 1.5 volt to 3.5 volts, etc. In certain examples of operation, the electrolyzer 104 voltage implemented via the power source 126 may be in the range of 1.3 to 5 volts, or at least 1.3 volts. In one example, the electrolyzer 104 voltage is 1.5 volts. In other examples, the electric potential may be in the range of 1 volt to 15 volts, e.g., at least 5 volts. In some embodiments, the current density may be at least 0.1 ampere per square centimeter ($A/cm^2$), such as in ranges of 0.001 $A/cm^2$ to 1 $A/cm^2$, 0.015 $A/cm^2$ to 0.9 $A/cm^2$, 0.01 $A/cm^2$ to 0.95 $A/cm^2$, etc. The current density may be implemented as a parameter with respect to current because current density takes into consideration of the geometry of the electrodes.

The sour-water treatment system 100 may include multiple electrolyzers 104, e.g., arranged in parallel (and/or series). A feed tank (vessel) for the sour water 102 supply may be disposed upstream of the electrolyzer(s) 104. In some implementations, the feed tank may supply the sour water 102 (e.g., via a pump) to the electrolyzer 104 or to multiple electrolyzers 104. The implementation of multiple electrolyzers 104 may mitigate certain instances of relatively-slow kinetics of the oxidation of hydrosulfide (e.g., eq. 2 in FIG. 2) that may be experienced at particular operating conditions of the electrolyzer 104, e.g., at 0.060 $A/cm^2$ and pH of 7.5-9.4.

Figure 2:
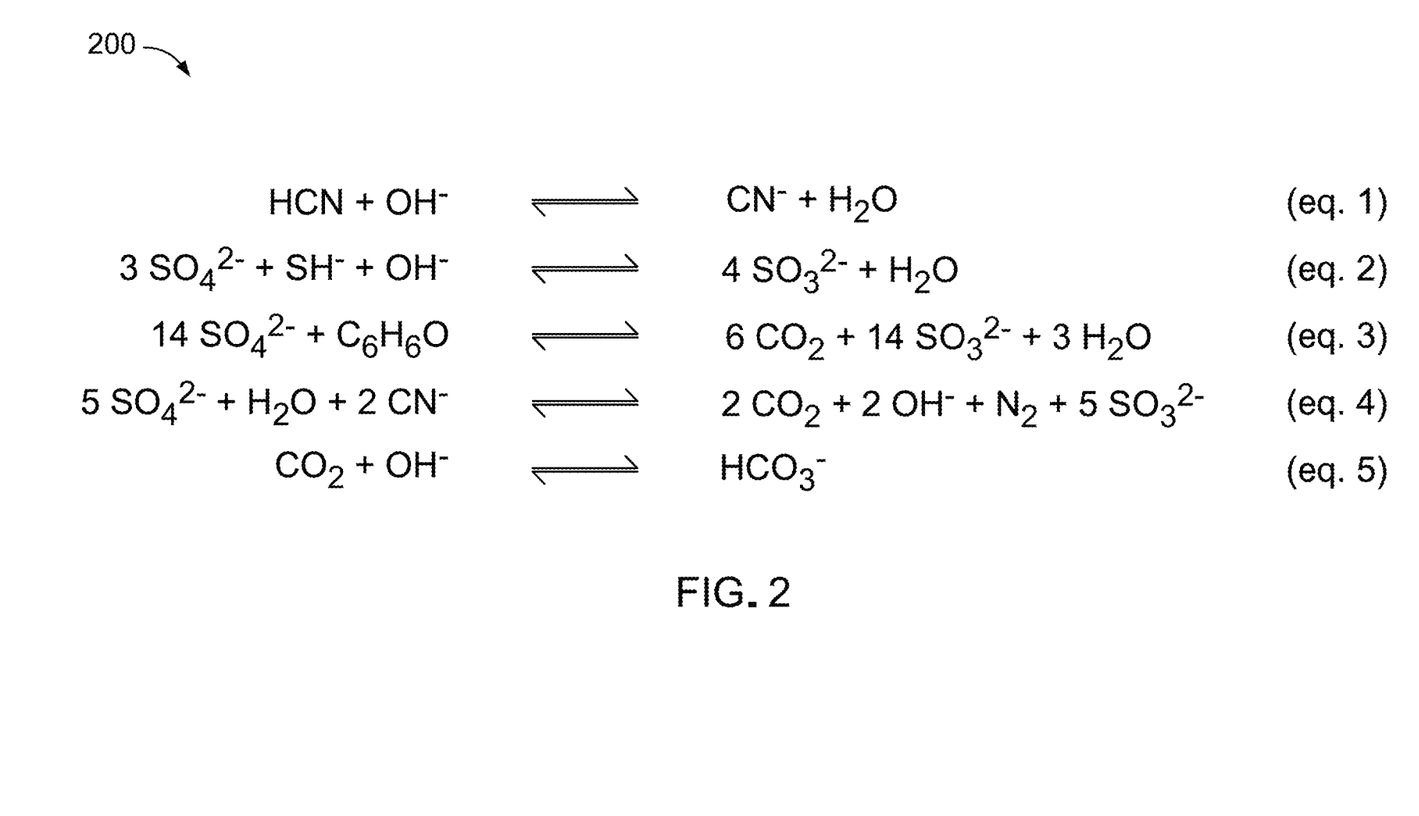
FIG. 2 is a list of examples of reactions as equations (eq.) that occur in the electrolyzer of FIG. 1.

FIG. 2 depicts examples 200 of reactions listed as equations (eq.) that occur in the electrolyzer 104 during operation, with aspects including the hydrosulfide chemistry. Equations 1 and 5 occur in the anodic chamber. The reaction equation 1 is the acido-basic (acid-base) reaction between hydrogen cyanide (HCN) and hydroxide ions to give cyanide ions ($CN^-$). The hydroxide ions are present from the water and from the addition of metal hydroxide (e.g., NaOH) for pH control. The reaction of equation 5 is the reaction of carbon dioxide (generated in equations 3 and 4) with the hydroxide ions to give bicarbonate ions ($HCO_3^-$). The bicarbonate ions may form salts with the metal from the metal hydroxide 116. The bicarbonate ions (e.g., as bicarbonate salt) may be separated from the anodic chamber solution downstream of the electrolyzer 104, as discussed below.

A series (equations 2-4) of oxido-reduction reactions (oxidation-reduction reactions) (redox) occurs at the electrodes to produce sulfate ions ($SO_4^{2-}$), nitrogen, and carbon dioxide at the anode 106 and produce sulfite ions ($SO_3^{2-}$) and hydroxide ions (in excess to maintain pH) at the cathode 108. Each oxido-reduction reaction (equations 2-4) has an oxido (oxidation) half-reaction that occurs at the anode 106 and a reduction half-reaction that occurs at the cathode 108.

In equation 2, the hydrosulfide $SH^-$ ions are oxidized at the anode 106 into sulfate ions, which is the oxido half-reaction; and the sulfate ions $SO_4^{2-}$ are reduced at the cathode 108 into sulfite ions, which is the reduction half-reaction.

In equation 3, the phenol $C_6H_6O$ (or phenolic compounds) is oxidized at the anode 106 into carbon dioxide, which is the oxido half-reaction; and the sulfate ions are reduced at the cathode 108 into sulfite ions, which is the reduction half-reaction.

In equation 4, the cyanide ions $CN^-$ are oxidized at the anode 106 into carbon dioxide and nitrogen, which is the oxido half-reaction; and the sulfate ions $SO_4^{2-}$ are reduced at the cathode 108 into sulfite ions, which is the reduction half-reaction.

Advantageously, HCN and phenolic compounds, which may be problematic for the environment, are addressed. The phenol (or phenolic compounds) is converted to carbon dioxide by the reaction of equation 3. The HCN is converted into carbon dioxide and nitrogen via the reactions of equations 1 and 4.

As indicated, the hydrosulfide ions ($SH^-$) in the sour water 102 that enters that electrolyzer 104 (to the anodic chamber 112) are oxidized (equation 2) into sulfate ions at the anode 106; and the generated sulfate ions are then reduced (equations 2-4) at the cathode 108 to give the sulfite ions. Electrochemical reduction occurs at the cathode 108 with electrons from the electricity source 126. The half-reaction occurring in equations 2-4 at the cathode 108 is the reduction of sulfate ions into sulfite ions and is as follows:

$$SO_4^{2-} + H_2O + 2e^- \rightleftharpoons SO_3^{2-} + 2OH^-$$

If sodium sulfate contaminates the sulfite stream, the sodium sulfate can be removed by downstream crystallization (or recrystallization) from sodium sulfite (solid) utilizing difference in solubility.

Electrochemical oxidation occurs at the anode 106. The half-reactions occurring in equations 2, 3 and 4 at the anode 106 are the oxidation of hydrosulfide ions, phenol, and cyanide ions, respectively, as follows:

$$SH^- + 9OH^- \rightleftharpoons SO_4^{2-} + 5H_2O + 8e^-$$

$$C_6H_6O + 28OH^- \rightleftharpoons CO_2 + 17H_2O + 28e^-$$

$$2CN^- + 8OH^- \rightleftharpoons 2CO_2 + N_2 + 4H_2O + 10e^-$$

Figure 3:
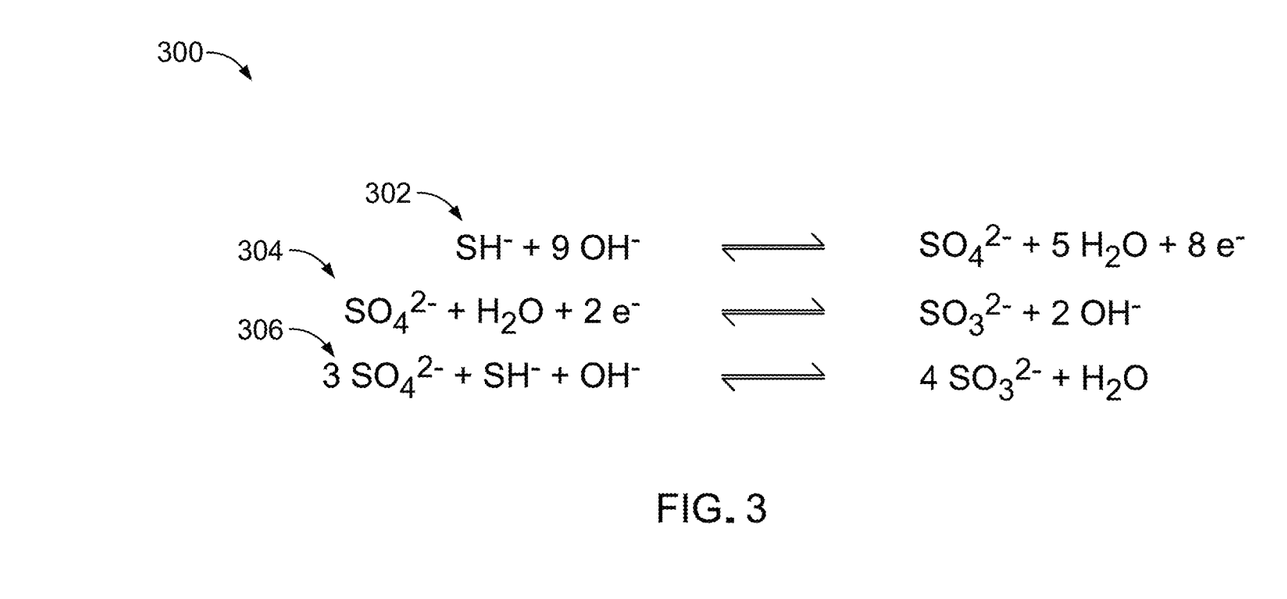
FIG. 3 is a list of example reactions involved in the transformation of hydrogen sulfide ions into sulfite ions in the electrolyzer of FIG. 1.

FIG. 3 is example reactions 300 involved in the transformation of the hydrogen sulfide ions into sulfite ions. The half reaction 302 (oxido half-reaction) occurs at the anode 106. The half reaction 304 (reduction half-reaction) occurs at the cathode 108. The overall reaction 306 is equation 2 of FIG. 2.

Referring to FIG. 1 and FIG. 2, the nitrogen and carbon dioxide produced at the anode 106 may form gas bubbles 128 in the fluid mixture in the anodic chamber 112. As indicated, the nitrogen is generated by the oxidation (equation 4) of the cyanide ions in the anodic chamber 112. The produced nitrogen 130 may vent from the electrolyzer 104 vessel from the anodic chamber 112. As mentioned, the generated carbon dioxide may react (equation 5) in the anodic chamber 112 with hydroxide ions to give bicarbonate ions. The cation associated with the bicarbonate ions may be sodium for this metal-exchange property in the formation of sodium bicarbonate by acido-basic reactions in cation exchange.

The right side of these reversible reactions (equations 1-5) in FIG. 2 may be favored by maintaining pH basic conditions for reactions of equations 1 and 5, and for oxido-reduction reactions of equations 2-4. Equation 1 may not be driven fully to the right. In the operating conditions (e.g., including pH of 7.5-9.4) of the electrolyzer 104, the HCN will be partially dissociated. The reaction in equation 1 may be push to completion by the consumption of $CN^-$ ion in equation 4.

The fluid mixture (anodic chamber solution) in the anodic chamber 112 discharges from the anodic chamber 112 as discharged anodic-chamber solution 132. The discharged anodic-chamber solution 132 is an aqueous solution and includes sulfate ions and bicarbonate ions. This solution 132 may be processed in a separation system having membranes. The separation system may remove bicarbonate ions 134 and water 136 to give a processed discharged anodic-chamber solution 138 having a greater concentration of sulfate ions than in the discharged anodic-chamber solution 132 as exited from the anodic chamber 112. The processed discharged anodic-chamber solution 138 is an aqueous solution concentrated in sulfate ions (e.g., sodium sulfate) and is routed to the cathodic chamber 114 of the electrolyzer 104. In the cathodic chamber 114, the sulfate ions are converted to sulfite ions via the aforementioned reduction half-reaction (e.g., 304 in FIG. 3) for equations 2-4 that converts the sulfate to sulfite at the cathode 108. The cathodic chamber 114 may discharge a discharged cathodic-chamber solution 139 that is an aqueous solution having the sulfite ions (e.g., as sodium sulfite). This solution 139 from the cathodic chamber 114 may be processed to recover relatively pure water 141 and to form solid metal sulfite 143 (e.g., solid sodium sulfite) as product, a discussed below.

In certain implementations, the separation system that removes bicarbonate ions and water from the discharged anodic-chamber solution 132 employs nanofiltration. Nanofiltration (NF) is a membrane filtration-based technique in which the pores of the membrane that pass through the membrane have a size (e.g., diameter), for instance, in a range of 1 nanometer (nm) to 10 nm. The pore size is generally smaller than pore size in microfiltration and ultrafiltration but larger (e.g., slightly larger) than that in reverse osmosis. The membrane in nanofiltration may be a polymer thin film(s), polyethylene terephthalate, or metals such as aluminum.

In the illustrated embodiment, the separation system includes a first nanofiltration system 140 and a second nanofiltration system 142. The first nanofiltration system 142 and the second nanofiltration system 144 may each have a set of membranes for nanofiltration. The membranes may be directed to removal of divalent ions via the nanofiltration. The membranes may be, for example, Dow® FilmTec™ NF270 membranes available from Dow Chemical Company having headquarters in Midland, Mich., USA. In another example, the membranes may be ESNA® (Energy Saving Nanofiltration) membranes (e.g., ESNA1-LF2-LD membrane) available from Hydranautics, Inc. having headquarters in Oceanside, Calif., USA. Other examples include TRISEP® TS40 membranes having a top layer made of polypiperazineamide (available from TriSep Corporation with headquarters in Goleta, Calif., USA), GE Osmonics DK membranes having a top layer made of polyamide (available from GE Osmonics Inc with headquarters in Minnetonka, Minn., USA), and San-Pro® SR3D membranes having a top layer of polyamide thin-film composite (available from Koch Separation Solutions [Wilmington, Mass., USA] a part of Koch Industries, Inc with headquarters in Wichita Kans.). Other nanofiltration membranes providing for similar or better rejection of divalent ions as the aforementioned specific membranes are applicable.

In the depicted embodiment, the discharged anodic-chamber solution 132 may flow from the anodic chamber 112 of the electrolyzer 104 via a conduit to the first nanofiltration system 140. A pump 144 may provide motive force for flow of the solution 132 to and through the first nanofiltration system 140. A feed vessel (not shown) to provide the solution 132 to the first nanofiltration system 140 may be disposed between the electrolyzer 104 and the pump 144. If multiple electrolyzers 104 are employed, the multiple electrolyzers 104 may discharge the solution 132 to the feed vessel.

As indicated, the solution 132 discharged from the anodic chamber 112 may have at least sulfate ions (e.g., as sodium sulfate) and bicarbonate ions (e.g., as sodium bicarbonate). This solution 132 from the anodic chamber 112 flows through the first nanofiltration system 140 to remove the bicarbonate ions 134 as permeate that is an aqueous solution enriched in sodium bicarbonate in this example Below a certain pH (e.g., 8.3) is adequate for the bicarbonate (and carbonic acid) to pass through the nanofiltration membranes. Above certain pH values (e.g., 8.3+), traces of carbonate species may contaminate the retentate 146 (sulfate stream). The retentate 146 discharged from the first nanofiltration system 140 is an aqueous solution of sulfate ions or sulfates. The retentate 146 (sulfate solution) is directed (e.g., pumped via pump 148) to the second nanofiltration system 142 to dewater the sulfate solution. The sulfate solution (retentate 146) may be dewatered in the second nanofiltration system 142 to give, for example, up to at least approximately 100 grams per liter (g/L) of total dissolved solids (TDS) in the retentate from the second nanofiltration system 142. The water 136 is removed as permeate. The TDS in the retentate from the second nanofiltration system 142 may be at least 50 g/L or at least 75 g/L, or in a range of 25 g/L to 100 g/L.

In the illustrated example, this retentate that discharges from the second nanofiltration system 142 is the processed discharged anodic-chamber solution 138, which is an aqueous solution concentrated in sodium sulfate and is routed to the cathodic chamber 114 of the electrolyzer 104. Supplemental sodium sulfate 150 may be added (e.g., via the addition of a concentrated sulfate solution having the supplemental sodium sulfate 150 dissolved in water) to the processed discharged anodic-chamber solution 138 already concentrated in sodium sulfate. The supplemental sodium sulfate 150 may additionally include ammonium sulfate.

The supplemental sodium sulfate 150 may be from added from a source 152 that receives a commercial supply of sodium sulfate and has a vessel for addition. The sodium sulfate 150 as a concentrated sulfate solution (aqueous solution having the supplemental sodium sulfate 150) may be added from the vessel via a pump. Other sources 152 are applicable. For instance, FIG. 4 discussed below is an example of a source 152 for an aqueous solution concentrated with the supplemental sodium sulfate.

The supplemental sodium sulfate 150 is added to the processed discharged anodic-chamber solution 138 to adjust the stoichiometry of the reaction of equation 2 (e.g., as a main reaction) in the cathodic chamber 114. The amount of sulfate ions formed in the anodic chamber 112 is less than the stoichiometric relationship for equation 2 in the cathodic chamber 114. Therefore, the supplemental sodium sulfate 150 is added to give total the stoichiometric quantity for equation 2 in the cathodic chamber 114. In one example, the amount of sulfate ions formed in the anodic chamber 112 is about ⅓ of the stoichiometric relationship in equation 2. Therefore, ⅔ of the sulfate ions for the stoichiometric relationship in equation 2 is added via the addition of the supplemental sodium sulfate 150 from the source 152. In all, the processed discharged anodic-chamber solution 138 in route to the cathodic chamber 114 may be further enriched in sulfate ions via the addition of the supplemental sodium sulfate 150.

In the cathodic chamber 114, the sulfate ions are converted to sulfite ions via the aforementioned reduction reaction (e.g., 304 in FIG. 3) for the reduction half-reaction of equations 2-4 that converts the sulfate ions to sulfite ions at the cathode 108.

The fluid mixture in the cathodic chamber 114 having the sulfite ions leaves the electrolyzer 104 from the cathodic chamber 114. As mentioned, this discharged cathodic-chamber solution 139 having the sulfite ions discharges from the electrolyzer 104 from the cathodic chamber 114.

The discharged cathodic-chamber solution 139 having the sulfite ions is fed via a conduit to a crystallizer 152 vessel. In some embodiments, the discharged cathodic-chamber solution 139 may be sent through a series (not shown) of at least two nanofiltration systems to further concentrate the sulfite ions prior to introduction to the crystallizer. The crystallizer 152 may be a vacuum crystallizer. The crystallization that occurs in the crystallizer 152 vessel may be a chemical solid-liquid separation technique in which mass transfer of a solute from the liquid solution to a pure solid crystalline phase occurs. This chemical-engineering process crystallization may resemble precipitation but the resulting solid is generally a crystal and not amorphous or disordered.

The crystallizer 152 is a vacuum crystallizer 152. The crystallizer 152 may be, for example, a mixed-suspension, mixed-product-removal (MSMPR) crystallizer, a force-circulation (FC) crystallizer, a draft-tube baffle (DTB) crystallizers, or a cascade of crystallizers. The crystallizer 152 may be multiple crystallizers 152. The crystallizer 152 may be continuous or batch. For larger amounts of discharged cathodic-chamber solution 139 (e.g., greater than 10 m³/hr) as feed, a continuous crystallizer (e.g., MSMPR) may be utilized. For less amounts of discharged cathodic-chamber solution 139 as feed, a batch crystallizer (e.g., MSMPR) may be utilized. In one example, the flowrate of discharged cathodic-chamber solution 139 as feed is in a range of 0.2 m³/hr to 1 m³/hr. In that example, the crystallizer 152 may be, for instance, a plurality of FC crystallizers in series or a plurality of batch MSMPR crystallizers.

The crystallizer 152 includes a mechanical agitator 154 driven by an electric motor 156. The agitator 154 includes a mixer that is rotated via a shaft by the motor 156. The mixer as an impeller generally may include an axial flow impeller, a radial flow impeller, propeller, blades, turbine mixer, ribbon blender (ribbon-shaped metal-mixer impeller), etc. In operation, the mechanical agitator 154 may mix the contents of the crystallizer 152 vessel.

The crystallizer 152 has a heat transfer system including a heat-transfer jacket 158 on the crystallizer 152 vessel. Thus, the crystallizer 152 vessel is a jacketed vessel. The heat transfer system includes a heat exchanger 160. In operation of the heat transfer system, a heat transfer fluid circulates through the heat-transfer jacket 158 to heat (or cool) the contents in the crystallizer 152 vessel. The heat exchanger 160 may heat (or cool) the circulating heat-transfer fluid. In the circuit, the heat exchanger 160 may receive return heat-transfer fluid from the jacket 158 and discharge supply heat-transfer fluid to the jacket 158.

In one example, the discharged cathodic-chamber solution 139 as feed at the inlet of the crystallizer 152 has a temperature of approximately 40° C. In some implementations, the solution 139 may be heated in an inlet heat exchanger (not shown) or in the crystallizer 152 vessel, for example, to between 50° C. and 80° C. with a vacuum in a range of 10 kilopascals (kPa) to 50 kPa. In other words, the vacuum of 10 kPa to 50 kPa covers the temperature range between 50° C. and 80° C. in this example. The heated temperature may be extended, for example, to cover between 20° C. to 95° C. with a vacuum of 2 kPa to 85 kPa. These pressure ranges are beneficially considered as a rough vacuum (e.g., with rough vacuum being a vacuum of 1 kPa to 101 kPa) and therefore special or complex vacuum systems for strong vacuum may be avoided in implementations.

Evaporated water 141 may discharge overhead from the crystallizer vessel 152. The water 141 discharged from the vacuum crystallizer 152 may be at least 75 vol % (or in the range of 60 vol % to 80 vol %) of the water that entered in the feed (discharged cathodic-chamber solution 139). The resulting aqueous solution concentrated in sulfite ions (due to the water 141 removal) in the crystallizer 152 is cooled in the crystallizer 152 via the crystallizer heat transfer system 160 and/or cooled as the discharged effluent 162 through a heat exchanger (not shown).

The aqueous solution concentrated in sulfite ions may be cooled, for example, to about 40° C. (or less than 40° C.) to yield solid metal sulfite (e.g., solid sodium sulfite). The effluent 162 may be a slurry having the solid metal sulfite (e.g., sodium sulfite), water, and sulfite ions. The solid metal sulfite 143 is separated from the effluent 162 in a filter 164 leaving an aqueous solution 166 of sulfite ions, such as an aqueous solution of ammonium sulfite. A portion 168 (e.g., 45%-55%) of the aqueous solution 166 may be recycled to the crystallizer 152 vessel.

Thus, the crystallizer 152 may discharged a recovered water 141 stream and an effluent 162 (residual stream). The effluent 162 may be a slurry. The effluent 162 may be separated by filtration into (1) sodium sulfite as a solid and (2) a concentrated aqueous solution of ammonium sulfite, which can both be valorized.

As for operation of the crystallizer 152, the heat transfer system associated with vacuum crystallizer 152 including the heat transfer jacket 158, circulating heat transfer fluid, and the heat exchanger 160 may heat the aqueous sulfite solution in the crystallizer 152 to maintain the saturation temperature. The heating may compensate for the latent heat of vaporization of the water 141 evaporated in the vacuum conditions. The removal of the water 141 may saturate or concentrate the sulfites (sulfite ions) in the aqueous sulfite (sulfite ion) solution with decreasing solubility at decreasing temperature. For example, the pressure may be gradually reduced to evaporate the solvent water and the temperature of the aqueous sulfite solution decreases. By lowering the temperature, the sulfites may be saturated to produce solid metal sulfites. Saturation may cause the metal sulfites (e.g., sodium sulfite) to crystallize (or precipitate). In some embodiments, the discharged cathodic-chamber solution 139 at the inlet of the crystallizer 152 may have a temperature in a range of 30° C. to 50° C., 30° C. to 45° C., from 30° C. to 40° C., 35° C. to 50° C., 35° C. to 45° C., or 40° C. to 50° C., and so forth. The aqueous sulfite solution in the vacuum crystallizer 152 may be heated in vacuum crystallizer 152 to a temperature in a range of 50° C. to 80° C., 50° C. to 75° C., 50° C. to 70° C., 50° C. to 65° C., 60° C. to 80° C., or 60° C. to 75° C., and so on. The aqueous sulfite solution may be saturated under a vacuum at absolute pressures of 2 kPa to 85 kPa, 5 kPa to 70 kPa, 10 kPa to 50 kPa, etc.

The vacuum pressures are presented herein in absolute pressure. For example, a vacuum at 10 kPa absolute is an absolute pressure of 10 kPa. Likewise, a vacuum at 50 kPa absolute is an absolute pressure of 50 kPa. A vacuum at 10 kPa absolute is a stronger (more) vacuum than a vacuum at 50 kPa absolute.

Moreover, with the lowering of the absolute pressure (increasing vacuum) in the crystallizer 152, the operating temperature may generally decrease. In this context of decreasing pressure (increasing vacuum) and associated evaporative cooling, the operating temperature of the crystallizer 152 may generally be correlative with the vacuum in the crystallizer 152. For instance, in one example, at a vacuum at 46 kPa in the crystallizer, the temperature may be 80° C. in the crystallizer 152. In that example, at a vacuum at 12 kPa, the temperature may be 50° C. in the crystallizer 152. As the pressure decreases (increasing vacuum), the operating temperature may decrease.

As mentioned, the aqueous sulfite solution may be cooled in the crystallizer 152. In some embodiments, the effluent 162 discharged from the crystallizer 152 may have a temperature, for example, in the ranges of 30° C. to 50° C., 30° C. to 45° C., 30° C. to 40° C., 35° C. to 50° C., 35° C. to 45° C., or 40° C. to 50° C.

As mentioned, wet metal sulfite solid 143 is isolated from the slurry effluent 162 by filtration via filter(s) 164, while a liquor of the crystallization that is an aqueous solution 166 concentrated in sulfite ions (e.g., as ammonium sulfite) is generated. The filter 164 can be a belt filter, a drum filter, a disk filter, or other filter that can handle the continuously filtering of the formed salts. The solid metal sulfite 143 isolated may be, for example, 40% to 70% (or 60% to 90%) of the metal sulfite entering in the effluent 162 to the filter 164. The aqueous solution 166 may include some of the entering metal sulfite (e.g., sodium sulfite) in addition to the ammonium sulfite. As also mentioned, a portion 168 of the aqueous solution 166 (e.g., concentrated aqueous solution of ammonium sulfite) discharged from the filter 164 may be recycled to the crystallizer 152.

The solid metal sulfite 143 and the aqueous solution 166 may each be subjected to further processing. The metal sulfite 143 as sodium sulfite and discharged from the filter 164 as hydrated can be valorized in the paper industry, water treatment industry (as an oxygen scavenger), and other industries. Ammonium sulfite from the aqueous solution 164 can be used in the building industry (e.g., manufacture of bricks), metal industry, and other industries.

An embodiment is a sour-water treatment system (e.g., FIG. 1) including an electrolyzer (e.g., 104) vessel and an electric power source to generate an electric potential between an anode and a cathode in the electrolyzer vessel. The electrolyzer vessel may include a diaphragm (e.g., cation exchange diaphragm) separating the anodic chamber from the cathodic chamber. The electrolyzer vessel has the anodic chamber to receive sour water including hydrosulfide ions and a carbon-containing compound. The sour water may include hydrogen sulfide or ammonium hydrosulfide, or both. The sour-water treatment system may include a flow control valve (and controller) to add a metal hydroxide (e.g., NaOH) to the anodic chamber to maintain pH of at least 7.5 in the electrolyzer vessel. The anodic chamber has the anode to convert the hydrosulfide ions into sulfate ions via an oxido half-reaction (e.g., 302 in FIG. 3) of a first oxido-reduction reaction (e.g., eq. 2 in FIG. 2) and generate carbon dioxide via an oxido half-reaction of a second oxido-reduction reaction (e.g., eq. 3 or eq. 4 in FIG. 2) associated with the carbon-containing compound. The generated carbon dioxide reacts with hydroxide ions in the anodic chamber to generate bicarbonate ions in the anodic chamber. The carbon-containing compound may be a first carbon-containing compound that is hydrogen cyanide and a second carbon-containing compound that is a phenolic compound. The second oxido-reduction reaction may be an oxido-reduction reaction (e.g., eq. 3) of the first carbon-containing compound that is a phenolic compound. The second oxido-reduction reaction may be an oxido-reaction (e.g., eq. 4) of a cyanide ion from the second carbon-containing compound that is hydrogen cyanide.

The sour-water treatment system includes a separation system having membranes to remove the bicarbonate ions and water from a discharged anodic-chamber solution (e.g., 132) (aqueous solution having sulfate ions) discharged from the anodic chamber. The discharged anodic-chamber solution may include sodium sulfate giving sulfate ions, and sodium bicarbonate giving bicarbonate ions.

The separation system outputs a processed discharged anodic-chamber solution (e.g., 138) having a greater concentration of sulfate ions than in the discharged anodic-chamber solution fed to the separation system. The separation system may include a first nanofiltration system (having a set of membranes) to remove the bicarbonate ions as a first permeate from the discharged anodic-chamber solution giving a first retentate having the sulfate ions. The separation system may have a second nanofiltration system (having a set of membranes) to remove the water as a second permeate from the first retentate giving a second retentate that is the processed discharged anodic-chamber solution. In some implementations, a vessel adds additional sulfate ions (e.g., 150) to the processed discharged anodic-chamber solution. In certain implementations, a second sour-treatment system (e.g., FIG. 4) adds sulfate ions (e.g., 150, 414) to the processed discharged anodic-chamber solution. The second sour-water treatment system has an electrolyzer vessel different than the electrolyzer vessel (e.g., 104) of the sour-water treatment system.

The cathodic chamber of the electrolyzer vessel is configured to receive the processed discharged anodic-chamber solution (e.g., having the additional sulfate ions). The cathodic chamber has the cathode to convert the sulfate ions into sulfite ions via a reduction half-reaction (e.g., 304 in FIG. 3) of the first oxido-reduction reaction. The cathodic chamber is configured to discharge a cathodic chamber solution having the sulfite ions (e.g., including sodium sulfite dissolved in the discharged cathodic-chamber solution). The sour-water treatment system may include a crystallizer vessel(s) to remove water from the discharged cathodic-chamber solution having the sulfite ions discharged from the cathodic chamber to give a slurry having solid metal sulfite (e.g., solid sodium sulfite). The sour-water treatment system may include a filter(s) to remove the solid metal sulfite (e.g., as product) from the slurry giving filtrate having sulfite ions. The filter may be, for example, a belt filter, a drum filter, a disk filter, etc. The filtrate may be an aqueous solution of ammonium sulfite.

Figure 4:
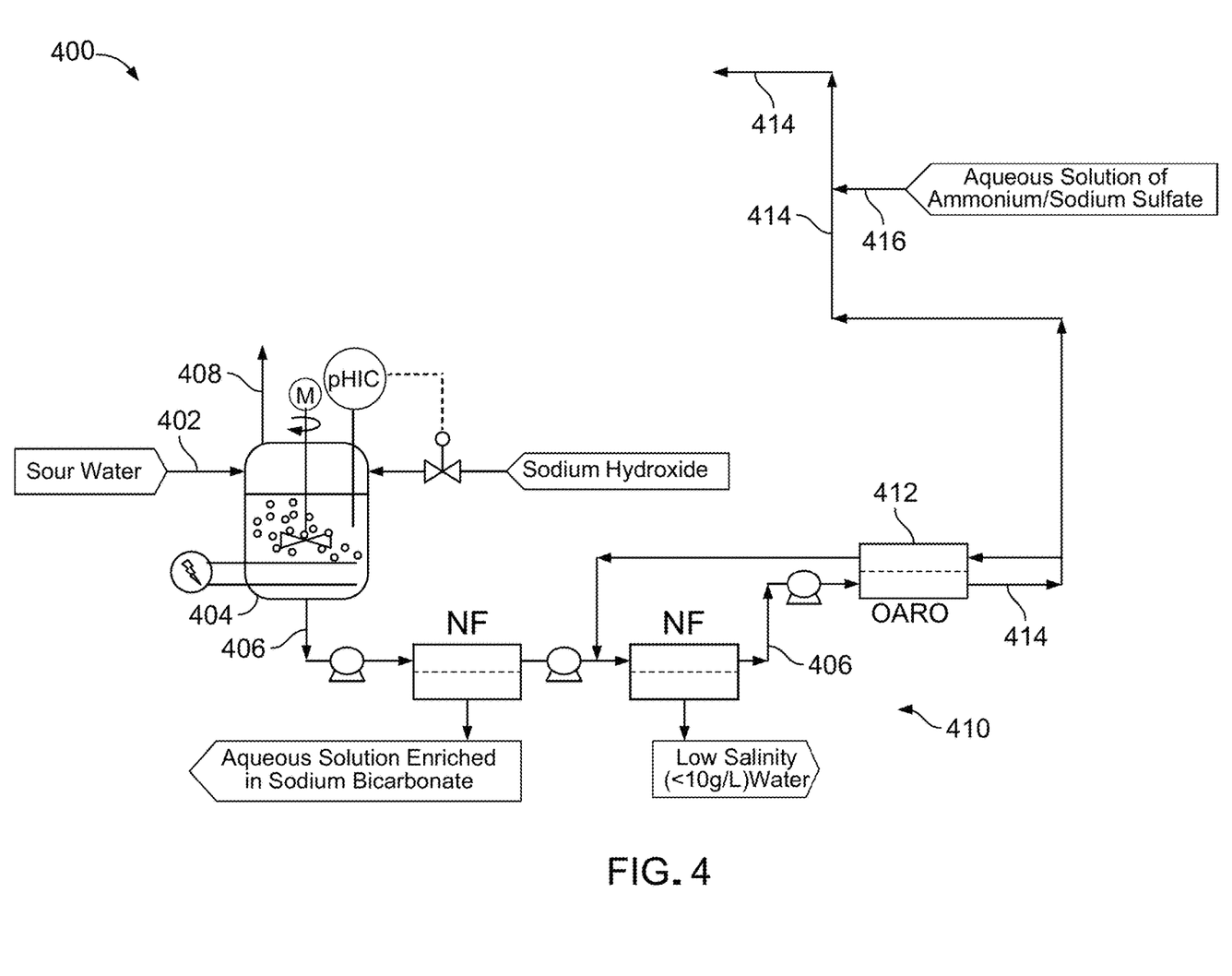
FIG. 4 is a diagram of a second sour-water treatment system.

FIG. 4 is a sour-water treatment system 400 that may be the source 152 of supplemental sodium sulfate 150 in FIG. 1. The sour-water treatment system 400 receives sour water 402 to be treated. The sour water 402 may be the same or similar as the sour water 102 received in FIG. 1. The treatment system 400 includes an electrolyzer 404 vessel that receives the sour water 402 and discharges treated sour water 406.

The electrolyzer 404 vessel has at least two electrodes (an anode and a cathode) but typically no diaphragm or membrane. There may be multiple anodes and multiple cathodes distributed in the electrolyzer 404 vessel. In some, implementations, the position of the multiple electrodes (e.g., in the bottom portion or middle portion of the electrolyzer 404 vessel) may promote that gases produced in the electrolyzer 404 contribute to mixing of the contents in the electrolyzer 404 vessel. In the illustrated embodiment, the electrolyzer 404 includes a mechanical agitator driven by an electric motor. The agitator includes an impeller rotated via a shaft by the motor to mix contents of the electrolyzer 404. In some examples, the electrolyzer 404 may have a baffle(s) to promote mixing. The electrolyzer 404 system includes a pHIC and a control valve to add a metal hydroxide (e.g., NaOH) to the electrolyzer 404 vessel to control pH of the fluid mixture. The pH may be maintained, for example, in the range of 7.1 to 9.8. The electrolyzer 404 system includes an electric power source electrically coupled to each of the anode and the cathode to produce an electric potential between the anode and the cathode, causing an electric current to pass through the fluid mixture in the electrolyzer 404 vessel. The electric power source may produce voltage and current for the electrolysis. The applied voltage and current density may be similar as discussed above for the electrolyzer 104 of FIG. 1.

The electrolysis conducted in the electrolyzer 404 via the electrodes may convert sulfides into sulfate ions (sulfates) and may also convert carbon-containing compounds into bicarbonate ions (bicarbonates). The electrolysis performed in the electrolyzer 404 may also additionally produce hydrogen gas or nitrogen gas, or both. The hydrogen gas or nitrogen gas, or both, may discharge in a gas stream 408 from the electrolyzer 404 vessel. The hydrogen may be directed to a fuel cell(s) to generate electrical power, which may reduce the energy consumption of the system 400. Additionally or alternatively, the hydrogen may be passed to another process as a reactant, intermediate, or fuel gas stream.

Below are five reactions that may occur in the electrolyzer 404 vessel:

HCN+OH$^-$⇌CN$^-$+H$_2$O    Reaction 1

3H$_2$O+SH$^-$+OH$^-$⇌SO$_4^{2-}$+4H$_2$    Reaction 2

11H$_2$O+C$_6$H$_6$O⇌6CO$_2$+14H$_2$    Reaction 3

6H$_2$O+2CN$^-$⇌2CO$_2$+20H$^-$+N$_2$+5H$_2$    Reaction 4

CO$_2$+OH$^-$⇌HCO$_3^-$    Reaction 5

Reaction 1 is an acido-basic reaction between hydrogen cyanide and hydroxide ions to produce cyanide ions, which is the same as equation 1 discussed above for the electrolyzer 104 of FIG. 1. Reaction 2, Reaction 3, and Reaction 4 are a series of oxido-reduction reactions that produce sulfate ions, hydroxide ions, nitrogen, hydrogen, and carbon dioxide. Reaction 5 is a reaction of carbon dioxide with hydroxide ions to produce bicarbonate ions, which is the same as equation 5 discussed above for the electrolyzer 104 of FIG. 1. The bicarbonate ions may form salts with the metal from the metal hydroxide added for pH control. The bicarbonate salts may be separated from the treated sour water 406 downstream of the electrolyzer 404. Hydroxide ions, such as hydroxide ions produced through Reaction 4 and hydroxide ions added by way of the metal hydroxide introduced, may maintain the pH of the electrolyzer 100 from 7.1 to 9.8. The treated sour water 406 may have a pH from 7.1 to 9.8 when passed out of the electrolyzer 404. As shown in Reactions 1, 2, 3, 4, and 5, the reactions to produce bicarbonates may occur in basic conditions. In contrast, as shown in Reaction 6 and Reaction 7 below, the oxidation of sulfides, such as hydrogen sulfides, to sulfuric acid may occur in acidic conditions, such as at pH less than 7. The energy consumption, for example, voltage for the electrolysis, for Reaction 6 and Reaction 7 in acidic conditions is the same as for the reactions in basic conditions.

H$_2$S+32H$_2$O⇌8SO$_4$H$^-$+8H$^+$+32H$_2$    Reaction 6

NH$_4$SH+32H$_2$O⇌8SO$_4$H$^-$+8NH$_4$++32H$_2$    Reaction 7

In the separating process discussed below, the bicarbonate ions may be separated from the treated sour water 406. At a pH of from 7.1 to 9.8, sulfates may be separated from the treated sour water 406, which includes the water, sulfates, and bicarbonates. Under acidic conditions having pH less than 7.1, the treated sour water 406 may include the water, sulfates, and bisulfates. The proportion of bisulfates in the total sulfates in the treated sour water 406 may increase with decreasing pH (increasing acidity). For example, at a pH of 7, no bisulfates are present in the treated sour water 406. As the pH is decreased to 5.9 and again to 1.9, the proportion of bisulfates may increase to 0.01 mol % and 50 mol %, respectively, based on the total moles of sulfates and bisulfates in the treated sour water 406. Operating the electrolyzer 100 under acidic conditions may reduce the efficiency of separating the bicarbonates from the sulfates and bisulfates through nanofiltration. At a pH of greater than 5, a typical nanofiltration membrane may exhibit a rejection rate of bisulfate and sulfate of about 97%. Reducing the pH below 5 greatly decreases the rejection rate of bisulfate and sulfate, which results in greater amounts of the bisulfates and sulfates passed through the membrane. At pH of 2.5, the nanofiltration membrane may have a reject rate of bisulfates and sulfates of 7%. Thus, under acidic conditions of pH less than 7, separation of the bicarbonates from the sulfates by nanofiltration may be more difficult compared to operation in the pH range of 7.1 to 9.8.

Operation of the electrolyzer 404 at pH greater than 9.8 may also have adverse effects on the separation efficiency of a nanofiltration process for separating bicarbonates from sulfates in the treated sour water 406. In a pH range of from 7.1 to 8.5, the typical nanofiltration membrane may have a rejection rate of bicarbonate of 30% of the total bicarbonate in the treated sour water 406. This rejection rate of bicarbonate increases with increasing pH. For example, at a pH of 9, the nanofiltration membrane may have a reject rate of bicarbonates of 40%. Thus, operation of the electrolyzer 404 at pH greater than 9.8 may greatly reduce the efficiency of separation of bicarbonates from sulfates through nanofiltration. Thus, the electrolyzer 404 may be operated, for example, at a pH of from 7.1 to 9.8.

Treatment of the sour water 402 in the electrolyzer 404 may be performed continuously, semi-continuously, or batchwise. Although shown in FIG. 4 as including a single electrolyzer 404, in some embodiments, the system 400 may include a plurality of electrolyzers 404, which may be arranged and operated in parallel or in series.

The treated sour water 406 may be passed from the electrolyzer 404 to a separation system 410 having membranes. The treated sour water 406 may include the sulfate ions and bicarbonate ions produced in the electrolyzer 404. The treated sour water 406 may also include excess metal hydroxide not consumed in the electrolyzer 404. The treated sour water 406 may have a pH of from 7.1 to 9.8. The separation system 410 may remove bicarbonate ions and water from the treated sour water 406 to concentrate sulfate ions in the treated sour water 406.

In the illustrated implementation, the separation system 410 includes two nanofiltration systems in series, which may be similar to (or same as) the nanofiltration systems discussed above with respect to FIG. 1. The separation system 410 further includes an osmotically-assisted reverse osmosis (OARO) system 412 to remove additional water from the treated sour water 406. An OARO can generally be operated at lower applied hydraulic pressures than conventional reverse osmosis (RO). The retentate (concentrate sulfate solution) from the last nanofiltration system may be pumped through the OARO system 412 to remove additional water to further increase the sulfate concentration. The OARO system 412 may discharge an aqueous solution 414 concentrated in sulfate ions (e.g., metal sulfates such as sodium sulfate). A portion of the aqueous solution 414 may be passed back through the OARO system 412, as a drawing solution, on a permeate side of a semi-permeable membrane of the OARO system 412.

The aqueous solution 414 of concentrated sulfate ions (e.g., sodium sulfate) may be discharged by the sour water treatment system 400 as the supplemental sulfate 150 stream to the sour water treatment 100 of FIG. 1. An aqueous solution 416 of ammonium sulfate or sodium sulfate, or both, may be added to the aqueous solution 414 of concentrated metal sulfate discharged from the OARO 412.

Figure 5:
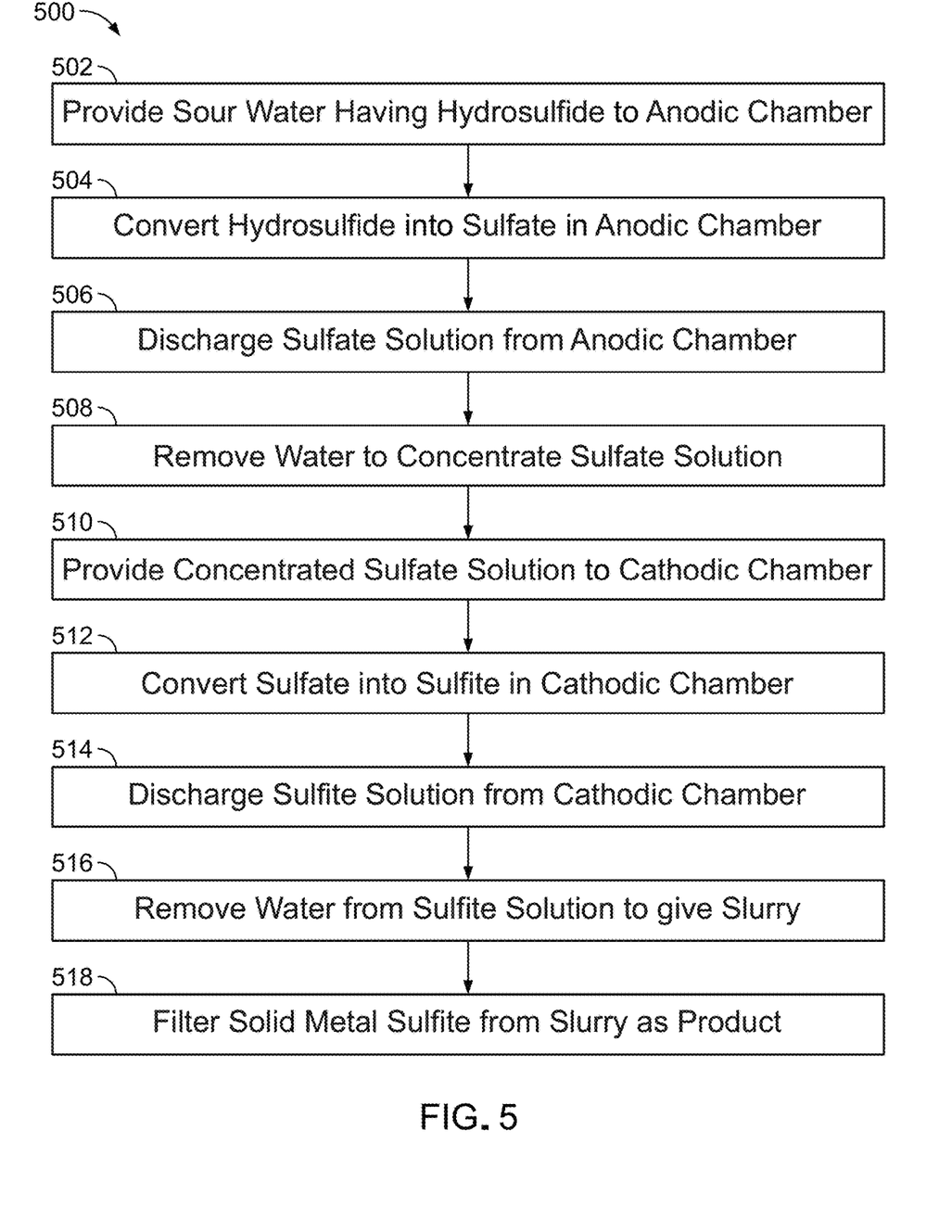
FIG. 5 is a block flow diagram of a method of operating a sour-water treatment system.

FIG. 5 is a method 500 of operating a sour-water treatment system (e.g., FIG. 1) having an electrolyzer vessel. The electrolyzer vessel has an anodic chamber and a cathodic chamber separated by a diaphragm (e.g., cation-exchange diaphragm). The method includes generating, via an electric power source, an electric potential between an anode in the anodic chamber and a cathode in the cathodic chamber.

At block 502, the method includes providing sour water having hydrosulfide ions and a carbon-containing compound to an anodic chamber of the electrolyzer vessel. The sour water may include ammonium hydrosulfide providing at least a portion of the hydrosulfide ions. The method may include adding a metal hydroxide (e.g., NaOH) to the anodic chamber to maintain pH of at least 7.5 in the electrolyzer vessel.

The carbon-containing compound may be HCN. The carbon-containing compound may a phenolic compound including the specific phenol compound $C_6H_6O$ or other phenolic compounds. The sour water may include both HCN and a phenolic compound. The carbon-containing compound may include a first carbon-containing compound that is HCN and a second carbon-containing compound that is a phenolic compound.

At block 504, the method includes converting the hydrosulfide ions into sulfate ions in the anodic chamber via an oxido half-reaction (e.g., 302 in FIG. 3) of a first oxido-reduction reaction (e.g., eq. 2 in FIG. 2). The oxido half-reaction is performed via the anode.

The method includes generating carbon dioxide in the anodic chamber via an oxido half-reaction of a second oxido-reduction reaction (e.g., eq. 3 or eq. 4 in FIG. 2) associated with the carbon-containing compound. The second oxido-reduction reaction (e.g., eq. 3) may include an oxido half-reaction of the carbon-containing compound (e.g., phenolic compound). The second oxido-reduction reaction (e.g., eq. 4) may include an oxido half-reaction of an ion (e.g., cyanide ion) from the carbon-containing compound (e.g., HCN). The method may include reacting HCN with hydroxide ions in an acid-base reaction in the anodic chamber to give the cyanide ions.

The method further includes reacting the generated carbon dioxide with hydroxide ions in the anodic chamber to generate bicarbonate ions. The bicarbonate ions may be removed, as discussed above and below (block 508).

At block 506, the method includes discharging an anodic chamber solution (a sulfate solution) from the electrolyzer vessel from the anodic chamber. The discharged anodic-chamber solution is an aqueous solution having the sulfate ions (e.g., as sodium sulfate) and the bicarbonate ions (e.g., as sodium bicarbonate).

At block 508, the method may include removing bicarbonate ions and water from the discharged anodic-chamber solution to give a processed discharged anodic-chamber solution (concentrated sulfate solution) having a greater concentration of sulfate ions than in the discharged anodic-chamber solution. The method may include removing the bicarbonate ions as a first permeate in a first nanofiltration system (including a set of membranes) giving a first retentate having the sulfate ions. The method may include removing the water as a second permeate from the first retentate via a second nanofiltration system (including a set of membranes) giving a second retentate that is the processed discharged anodic-chamber solution as a concentrated sulfate solution.

At block 510, the method may include providing the processed discharged anodic-chamber solution (concentrated sulfate solution) to the cathodic chamber of the electrolyzer. The method may include adding sulfate ions (e.g., as sodium sulfate) to the processed discharged anodic-chamber solution in route to the cathodic chamber to further increase the concentration of sulfate ions. This supplemental sulfate may be added to provide for (accommodate) the stoichiometry of equation 2 (FIG. 2) in the cathodic chamber, as discussed. In some implementations, the supplemental sulfate ions may be added as discharged from a second sour-water treatment system (e.g., FIG. 4) having an electrolyzer vessel without a diaphragm or membrane.

At block 512, the method may include converting the sulfate ions into sulfite ions in the cathodic chamber via a reduction half-reaction (e.g., 304 in FIG. 3) of the first oxido-reduction reaction. This reduction half-reaction is performed via the cathode.

At block 514, the method may include discharging from the cathodic chamber a cathodic chamber solution (sulfite solution) that is an aqueous solution having the sulfite ions. The discharged cathodic-chamber solution may include dissolved metal sulfite (e.g., sodium sulfite) giving the sulfite ions.

At block 516, the method may include removing water from the discharged cathodic-chamber solution (sulfite solution) to give a slurry having solid metal sulfite. The water may be removed by evaporation in a vacuum crystallizer vessel, as discussed. The water removed may be recovered water as pure water or substantially pure water. The solid metal sulfite (e.g., solid sodium sulfite) may form in the crystallizer vessel. The slurry discharged from the crystallizer vessel includes the solid metal sulfite, water, and sulfite ions.

At block 518, the method includes filtering (via a filter) the solid metal sulfite (as product) from the slurry giving filtrate having sulfite ions. As mentioned, the filter may be, for example, a belt filter, a drum filter, a disk filter, etc. The filtrate may be an aqueous solution of ammonium sulfite, which may also be a product to be valorized. The presence of the ammonium may be from the ammonium hydrosulfide that entered in the sour water to the electrolyzer and also from ammonium sulfate added upstream as supplemental sulfate (e.g., in stream 150 of FIG. 1).

A number of implementations have been described. Nevertheless, it will be understood that various modifications may be made without departing from the spirit and scope of the disclosure.

What is claimed is:

1. A method of treating sour water, comprising:
providing sour water comprising hydrosulfide ions and a carbon-containing compound to an anodic chamber of an electrolyzer vessel, the electrolyzer vessel comprising the anodic chamber and a cathodic chamber separated by a diaphragm;
generating, via an electric power source, an electric potential between an anode in the anodic chamber and a cathode in the cathodic chamber;
converting the hydrosulfide ions into sulfate ions in the anodic chamber via an oxido half-reaction of a first oxido-reduction reaction;
generating carbon dioxide in the anodic chamber via an oxido half-reaction of a second oxido-reduction reaction associated with the carbon-containing compound;
reacting the carbon dioxide with hydroxide ions in the anodic chamber to generate bicarbonate ions;
discharging an anodic chamber solution from the electrolyzer vessel from the anodic chamber as a discharged anodic-chamber solution comprising the sulfate ions and the bicarbonate ions;
removing bicarbonate ions and water from the discharged anodic-chamber solution to give a processed discharged anodic-chamber solution having a greater concentration of sulfate ions than in the discharged anodic-chamber solution; and
adding sulfate ions to the processed discharged anodic-chamber solution.

2. The method of claim 1, comprising adding a metal hydroxide to the anodic chamber to maintain pH of at least 7.5 in the electrolyzer vessel, wherein the diaphragm comprises a cation-exchange diaphragm, and wherein the sour water comprises ammonium hydrosulfide.

3. The method of claim 2, wherein the metal hydroxide comprises sodium hydroxide, and wherein the discharged anodic-chamber solution comprises sodium bicarbonate comprising the bicarbonate ions.

4. The method of claim 1, wherein adding the sulfate ions comprises adding sodium sulfate to the processed discharged anodic-chamber solution.

5. The method of claim 1, wherein adding the sulfate ions comprises adding sulfate ions discharged from a second sour-water treatment system comprising a second electrolyzer vessel without a diaphragm or membrane.

6. The method of claim 1, wherein removing the bicarbonate ions comprises removing the bicarbonate ions from the discharged anodic-chamber solution as a first permeate in a first nanofiltration system comprising membranes giving a first retentate comprising the sulfate ions.

7. The method of claim 6, wherein removing the water comprises removing the water as a second permeate from the first retentate via a second nanofiltration system comprising membranes giving a second retentate comprising the processed discharged anodic-chamber solution.

8. A method of treating sour water, comprising:
providing sour water comprising hydrosulfide ions and a carbon-containing compound to an anodic chamber of an electrolyzer vessel, the electrolyzer vessel comprising the anodic chamber and a cathodic chamber separated by a diaphragm;
generating, via an electric power source, an electric potential between an anode in the anodic chamber and a cathode in the cathodic chamber;
converting the hydrosulfide ions into sulfate ions in the anodic chamber via an oxido half-reaction of a first oxido-reduction reaction;
generating carbon dioxide in the anodic chamber via an oxido half-reaction of a second oxido-reduction reaction associated with the carbon-containing compound;
reacting the carbon dioxide with hydroxide ions in the anodic chamber to generate bicarbonate ions;
discharging an anodic chamber solution from the electrolyzer vessel from the anodic chamber as a discharged anodic-chamber solution comprising the sulfate ions and the bicarbonate ions;
removing bicarbonate ions and water from the discharged anodic-chamber solution to give a processed discharged anodic-chamber solution having a greater concentration of sulfate ions than in the discharged anodic-chamber solution;
providing the processed discharged anodic-chamber solution to the cathodic chamber of the electrolyzer vessel;
converting the sulfate ions into sulfite ions in the cathodic chamber via a reduction half-reaction of the first oxido-reduction reaction; and
discharging a cathodic chamber solution comprising the sulfite ions as a discharged cathodic-chamber solution.

9. The method of claim 8 wherein the discharged cathodic-chamber solution comprises sodium sulfite comprising the sulfite ions, the sodium sulfite dissolved in the discharged cathodic-chamber solution.

10. The method of claim 8, comprising:
removing water from the discharged cathodic-chamber solution to give a slurry comprising solid metal sulfite; and
filtering the solid metal sulfite from the slurry giving filtrate comprising sulfite ions.

11. The method of claim 10, wherein the solid metal sulfite comprises solid sodium sulfite, and wherein the filtrate comprising sulfite ions comprises ammonium sulfite.

12. The method of claim 1, wherein the second oxido-reduction reaction comprises an oxido-reduction reaction of the carbon-containing compound.

13. The method of claim 12, wherein the carbon-containing compound comprises a phenolic compound.

14. The method of claim 1, wherein the second oxido-reduction reaction comprises an oxido-reaction of an ion from the carbon-containing compound.

15. The method of claim 14, wherein the carbon-containing compound comprises hydrogen cyanide, and wherein the ion is a cyanide ion.

16. The method of claim 1, comprising reacting hydrogen cyanide with hydroxide ions in the anodic chamber to give cyanide ions, wherein the carbon-containing compound comprises the hydrogen cyanide.

17. The method of claim 1, wherein the carbon-containing compound comprises a first carbon-containing compound that is hydrogen cyanide and a second carbon-containing compound that is a phenolic compound.

* * * * *